(12) United States Patent
Kajaria (10) Patent No.: US 10,392,914 B2
(45) Date of Patent: Aug. 27, 2019

(54) SYSTEMS AND METHODS FOR FRACTURING A MULTIPLE WELL PAD

(71) Applicant: GE Oil & Gas Pressure Control LP, Houston, TX (US)

(72) Inventor: Saurabh Kajaria, Houston, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 130 days.

(21) Appl. No.: 15/471,919

(22) Filed: Mar. 28, 2017

(65) Prior Publication Data

US 2017/0275980 A1 Sep. 28, 2017

Related U.S. Application Data

(63) Continuation-in-part of application No. 15/343,463, filed on Nov. 4, 2016.

(60) Provisional application No. 62/314,001, filed on Mar. 28, 2016.

(51) Int. Cl.
*E21B 43/26* (2006.01)
*E21B 33/068* (2006.01)
*F16L 55/07* (2006.01)

(52) U.S. Cl.
CPC ............ *E21B 43/26* (2013.01); *E21B 33/068* (2013.01); *F16L 55/07* (2013.01)

(58) Field of Classification Search
CPC ......... E21B 43/26; E21B 33/068; F16L 55/07
USPC ....................................................... 166/90.1
See application file for complete search history.

(56) References Cited

U.S. PATENT DOCUMENTS

| | | | |
|---|---|---|---|
| 5,215,151 A * | 6/1993 | Smith | ....................... E21B 4/02 166/237 |
| 8,469,108 B2 | 6/2013 | Kajaria et al. | |
| 8,474,521 B2 | 7/2013 | Kajaria et al. | |
| 8,496,062 B2 | 7/2013 | Kajaria et al. | |
| 8,567,513 B2 | 10/2013 | Lacheny et al. | |
| 8,656,990 B2 | 2/2014 | Kajaria et al. | |
| 8,813,836 B2 | 8/2014 | Kajaria et al. | |
| 9,127,545 B2 | 9/2015 | Kajaria et al. | |
| 9,447,671 B2 | 9/2016 | Nguyen et al. | |
| 9,458,688 B2 | 10/2016 | Adkinson et al. | |
| 9,534,465 B2 | 1/2017 | Nguyen et al. | |
| 2012/0181013 A1* | 7/2012 | Kajaria | ................... E21B 43/26 166/79.1 |
| 2012/0181785 A1 | 7/2012 | Kajaria | |
| 2014/0020901 A1 | 1/2014 | Kajaria et al. | |
| 2014/0131954 A1 | 5/2014 | Koleilat et al. | |
| 2014/0151069 A1 | 6/2014 | Kajaria et al. | |
| 2015/0184491 A1 | 7/2015 | Kajaria et al. | |
| 2015/0292297 A1 | 10/2015 | Kajaria et al. | |

(Continued)

*Primary Examiner* — Anna M Momper
*Assistant Examiner* — Patrick F Lambe
(74) *Attorney, Agent, or Firm* — Hogan Lovells US LLP (57) ABSTRACT

A flow system for use at a hydraulic fracturing well site, including a tree attached to a wellhead, an inlet head in fluid communication with at least one hydraulic fracturing pump at the well site, and an adjustable fluid conduit providing fluid communication between the inlet head and the tree. The flow system further includes a valve in the fluid conduit and having an open position and a closed position, the valve permitting fluid flow through the fluid conduit when in the open position, and preventing fluid flow through the fluid conduit when in the closed position, at least a portion of the fluid conduit positioned between the valve and the tree.

20 Claims, 11 Drawing Sheets

(56) References Cited

U.S. PATENT DOCUMENTS

2015/0345272 A1  12/2015 Kajaria et al.
2016/0168970 A1   6/2016 Kajaria et al.
2017/0044872 A9   2/2017 Kajaria et al.

* cited by examiner

SYSTEMS AND METHODS FOR FRACTURING A MULTIPLE WELL PAD

CROSS REFERENCE TO RELATED APPLICATIONS

This application claims priority to and the benefit of, co-pending U.S. Provisional Application Ser. No. 62/314,001, filed Mar. 28, 2016, the full disclosure of which is hereby incorporated herein by reference in its entirety for all purposes. This application is a continuation-in-part of co-pending U.S. patent application Ser. No. 15/343,463, titled "Systems and Methods for Fracturing a Multiple Well Pad," filed Nov. 4, 2016, the full disclosure of which is hereby incorporated by reference in its entirety for all purposes.

BACKGROUND

1. Field of Invention

This invention relates in general to equipment used in the hydrocarbon industry, and in particular, to systems and methods for hydraulic fracturing operations.

1. Description of the Prior Art

Hydraulic fracturing is a technique used to stimulate production from some hydrocarbon producing wells. The technique usually involves injecting fluid, or slurry, into a wellbore at a pressure sufficient to generate fissures in the formation surrounding the wellbore. The fracturing fluid slurry, whose primary component is usually water, includes proppant (such as sand or ceramic) that migrate into the fractures with the fracturing fluid slurry and remain to prop open the fractures after pressure is no longer applied to the wellbore. Typically hydraulic fracturing fleets include a data van unit, blender unit, hydration unit, chemical additive unit, hydraulic fracturing pump unit, sand equipment, and other equipment.

The fluid used to fracture the formation is typically pumped into the well by high-powered hydraulic fracturing pumps. The pumps in typical fracing operations pump the fluid to a frac pump output header, also known as a missile, which in turn passes the fluid to a hydraulic fracturing manifold. The hydraulic fracturing manifold is located between the missile and a tree (assortment of valves and controls) located above the opening of a well bore. A plurality of dedicated fluid supply lines can connect the hydraulic fracturing manifold to a plurality of wells, with one supply line connected to a tree corresponding to each well. With this arrangement, an operator can use the hydraulic Fracturing manifold to isolate wells as they complete a frac cycle, and to redirect fluid to a different well that is ready to begin a new frac cycle. In some instances, actuated valves can improve transition time, increasing efficiency. Use of a hydraulic fracturing manifold in this manner is known in the industry as "zip" fracking.

One disadvantage to typical hydraulic fracturing spreads is that, when servicing multiple wells, the hydraulic fracturing, or zipper manifold, is typically located near the missile, and some distance from some or all of the wells. Thus, piping connecting the manifold to the trees of individual wells can be lengthy, and include many turns and bends. Such turns and bends lead to inefficiencies, and often require couplings and fittings that add possible failure points to the system.

SUMMARY

One aspect of the present technology provides a flow system for use at a hydraulic fracturing well site. The flow system includes a tree attached to a wellhead, an inlet head in fluid communication with at least one hydraulic fracturing pump at the well site, and fluid conduit providing fluid communication between the inlet head and the tree. The flow system further includes a valve in the fluid conduit and having an open position and a closed position, the valve permitting fluid flow through the fluid conduit when in the open position, and preventing fluid flow through the fluid conduit when in the closed position, at least a portion of the fluid conduit positioned between the valve and the tree.

Another aspect of the present technology provides a flow system for use at a hydraulic fracturing well site. The flow system includes a plurality of trees, each tree attached to a wellhead, an inlet head in fluid communication with at least one hydraulic fracturing pump at the well site, and a fluid conduit providing fluid communication between the inlet head and the plurality of trees, and including expandable conduit segments joined by connectors. The flow system further includes a plurality of valves in the fluid conduit, each valve corresponding to one of the plurality of trees, each valve having an open position and a closed position, each valve permitting fluid flow through the fluid conduit when in the open position, and preventing fluid flow through the fluid conduit when in the closed position, at least a portion of the fluid conduit positioned between at least one of the plurality of valves and its corresponding tree.

Yet another aspect of the present technology provides a method of providing pressurized fluid to a plurality of wells at a hydraulic fracturing well site. The method includes the steps of pressurizing fluid with at least one hydraulic fracturing pump, directing the fluid from the at least one hydraulic fracturing pump to a fluid conduit through an inlet head, and selectively directing the fluid into a well via the fluid conduit by opening and closing fluid communication between the at least one hydraulic fracturing pump and the at least one of the wells using valves positioned in the fluid conduit and corresponding to each of the plurality of wells. The method further includes the step of directing the fluid into a tree attached to the wellhead by attachment of the fluid conduit to the tree at a location adjacent the master service valve of the tree.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE INVENTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The invention, however, is not intended to be limited to the specific terms used, and it is to be understood that each specific term includes equivalents that operate in a similar manner to accomplish a similar purpose.

Embodiments of the present disclosure are directed to systems and methods for coupling manifolds to trees at well sites. Flow systems may include an inlet head to direct fluid toward a configuration that is coupled to one or more trees at the well site. Fluid conduits are positioned between valves to enable blocking of fluid flow to a particular tree of a plurality of trees, but to enable flow to other trees. In this manner, selective flow to the trees may be utilized to control, for example, fracturing operations. In embodiments, the fluid conduits include "S" spool configurations with rotating flanges to adjust a position of the flanges in an x, y, and z-direction, thereby enabling coupling of components when certain fittings are not exactly aligned and increasing flexibility at the well site. Moreover, the fluid conduits may include expansion joints to adjust a length of the fluid conduit for a given operation or line configuration. As such, increased flexibility for coupling connections at the well site may be provided.

Figure 1:
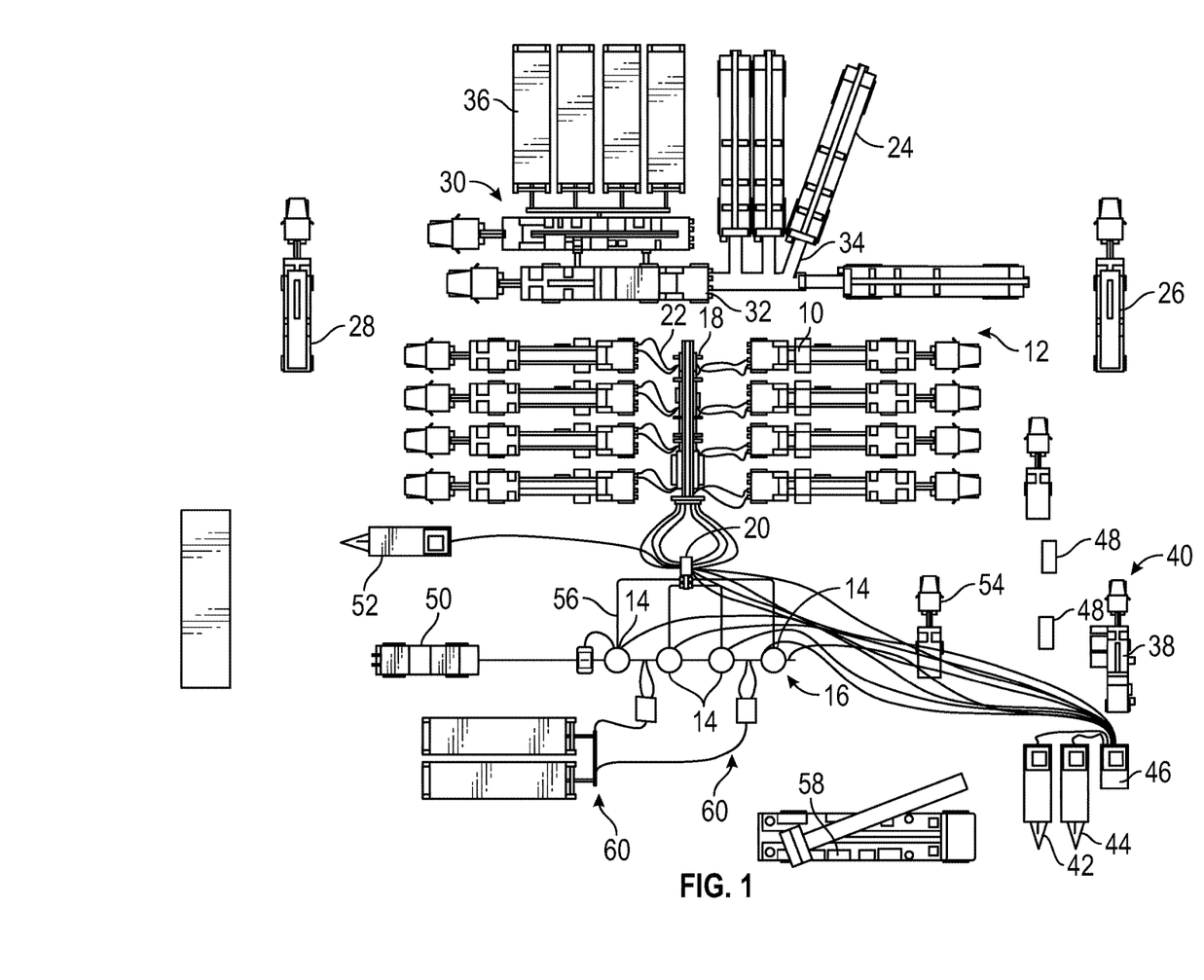
FIG. 1 is a schematic environmental view of a hydraulic fracturing site, in accordance with an embodiment of the present technology.

FIG. 1 shows a schematic environmental view of equipment used in a hydraulic fracturing operation. Specifically, there is shown a plurality of pumps 10 mounted to vehicles 12, such as trailers. The pumps 10 are fluidly connected to trees 14 attached to wellheads 16 via a missile 18, which is in turn connected to an inlet head 20. As shown, the vehicles 12 can be positioned near enough to the missile 18 to connect fracturing fluid lines 22 between the pumps 10 and the missile 18.

FIG. 1 also shows equipment for transporting and combining the components of the hydraulic fracturing fluid or slurry used in the system of the present technology. In many wells, the fracturing fluid contains a mixture of water, sand or other proppant, acid, and other chemicals. A non-exclusive list of possible examples of fracturing fluid components includes acid, anti-bacterial agents, clay stabilizers, corrosion inhibitors, friction reducers, gelling agents, iron control agents, pH adjusting agents, scale inhibitors, and surfactants. Historically, diesel fuel has at times been used as a substitute for water in cold environments, or where a formation to be fractured is water sensitive, such as, for example, slay. The use of diesel, however, has been phased out over time because of price, and the development of newer, better technologies.

In FIG. 1, there are specifically shown sand transporting containers 24, an acid transporting vehicle 26, vehicles for transporting other chemicals 28, and a vehicle carrying a hydration unit 30. Also shown is a fracturing fluid blender 32, which can be configured to mix and blend the components of the hydraulic fracturing fluid, and to supply the hydraulic fracturing fluid to the pumps 10. In the case of liquid components, such as water, acids, and at least some chemicals, the components can be supplied to the blender 32 via fluid lines (not shown) from the respective components vehicles, or from the hydration unit 30. In the case of solid components, such as sand, the components can be delivered to the blender 32 by conveyors 34. The water can be supplied to the hydration unit 30 from, for example, water tanks 36 onsite. Alternately, water can be provided directly from the water tanks 36 to the blender 32, without first passing through the hydration unit 30.

Monitoring equipment 38 can be mounted on a control vehicle 40, and connected to, e.g., the pumps 10, blender 32, the trees 14, and other downhole sensors and tools (not shown) to provide information to an operator, and to allow the operator to control different parameters of the fracturing operation. Other hydraulic fracturing well site equipment shown in FIG. 1 can include a greasing unit 42, a flushing unit 44, and RFOC 46, accumulators 48, Wireline 50, a test unit 52, trunk lines 54, and fluid conduit 56. The system may also include a crane 58, and flow back equipment 60, such as a choke manifold, plug catcher, desander, separator, and flares.

Figure 2:
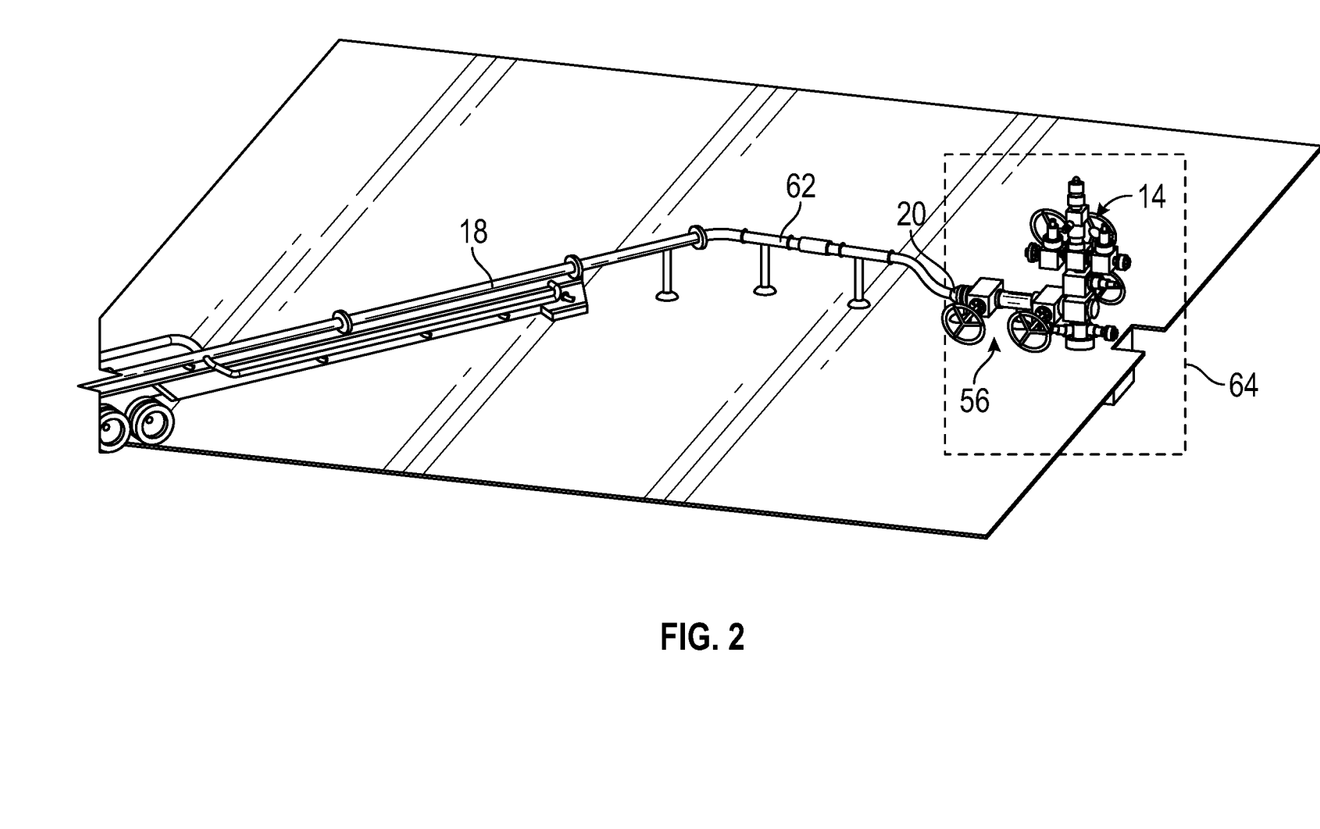
FIG. 2 is a perspective view of a single wellhead fluid delivery system, in accordance with an embodiment of the present technology.

Referring now to FIG. 2, there is shown more specifically the portion of the hydraulic fracturing system that delivers fluid from the hydraulic fracturing pumps 10 to each wellhead 16. In particular, FIG. 2 shows the missile 18, the inlet head 20, and the fluid line 62 connecting the missile 18 to the inlet head 20. FIG. 2 also shows the tree 14 and fluid conduit 56 connecting the inlet head 20 to the tree 14. One aspect of the present technology shown and described herein is the flow system 64, which includes the fluid conduit 56 between the inlet head 20 and the tree 14. In the embodiment of FIG. 2, as well as other embodiments described herein and shown in the drawings, both the fluid line 62 connecting the missile 18 to the inlet head 20, the inlet head 20 itself, and the fluid conduit 56 connecting the inlet head 20 to each well is large enough to carry the entire fluid volume and flow required to fracture a well. Moreover, in the embodiments shown and described, only one conduit is required per well to provide the fluid needed to fracture the well.

Figure 3:
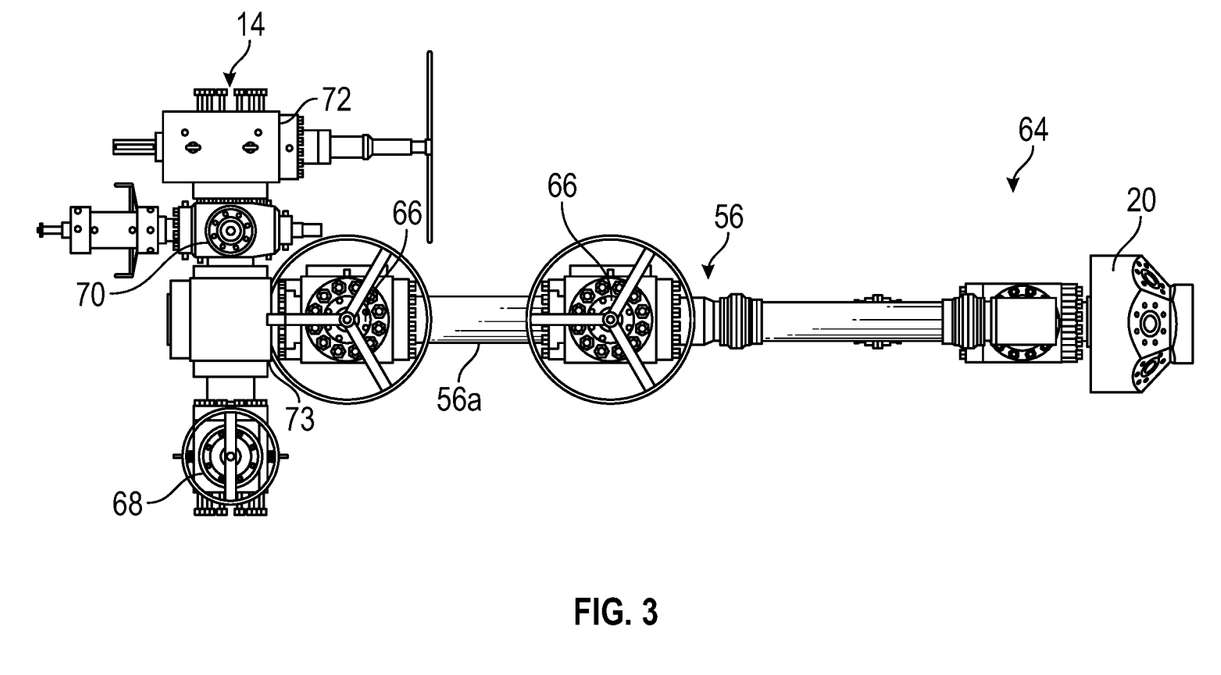
FIG. 3 is a side view of a wellhead fluid delivery system, in accordance with an embodiment of the present technology.

FIG. 3 shows an enlarged side view of the flow system 64 according to one embodiment of the present technology, including inlet head 20, tree 14, and fluid conduit 56. Fluid conduit 56 connects, and provides a fluid conduit, between the inlet head 20 and the tree 14. Fluid conduit 56 also includes at least one valve 66 capable of regulating fluid flow through the fluid conduit 56 between the inlet head 20 and the tree 14. The at least one valve 66, or combination of valves 66, can alternate between an open position, a closed position, and a partially open position. When in the open position, fluid flow through the fluid conduit 56 is unrestricted. When in the closed position, fluid flow through the fluid conduit 56 is prevented by the valve 66. When in the partially open position, fluid flow through the fluid conduit 56 is restricted, but not wholly prevented. The valves 66 can be controlled manually or remotely.

The tree 14 shown in FIG. 3 includes multiple parts, including a series of tree valves. Such tree valves may include, but are not limited to, a master valve 68, wing valves 70, and a swab valve 72. Although a single master valve 68 is shown in FIG. 3, some trees 14 may include both upper and lower master valves. Similarly, although details of the wing valves 70 are not shown in FIG. 3, there may be multiple wing valves, including, for example, a kill wing valve and a production wing valve.

Figure 4:
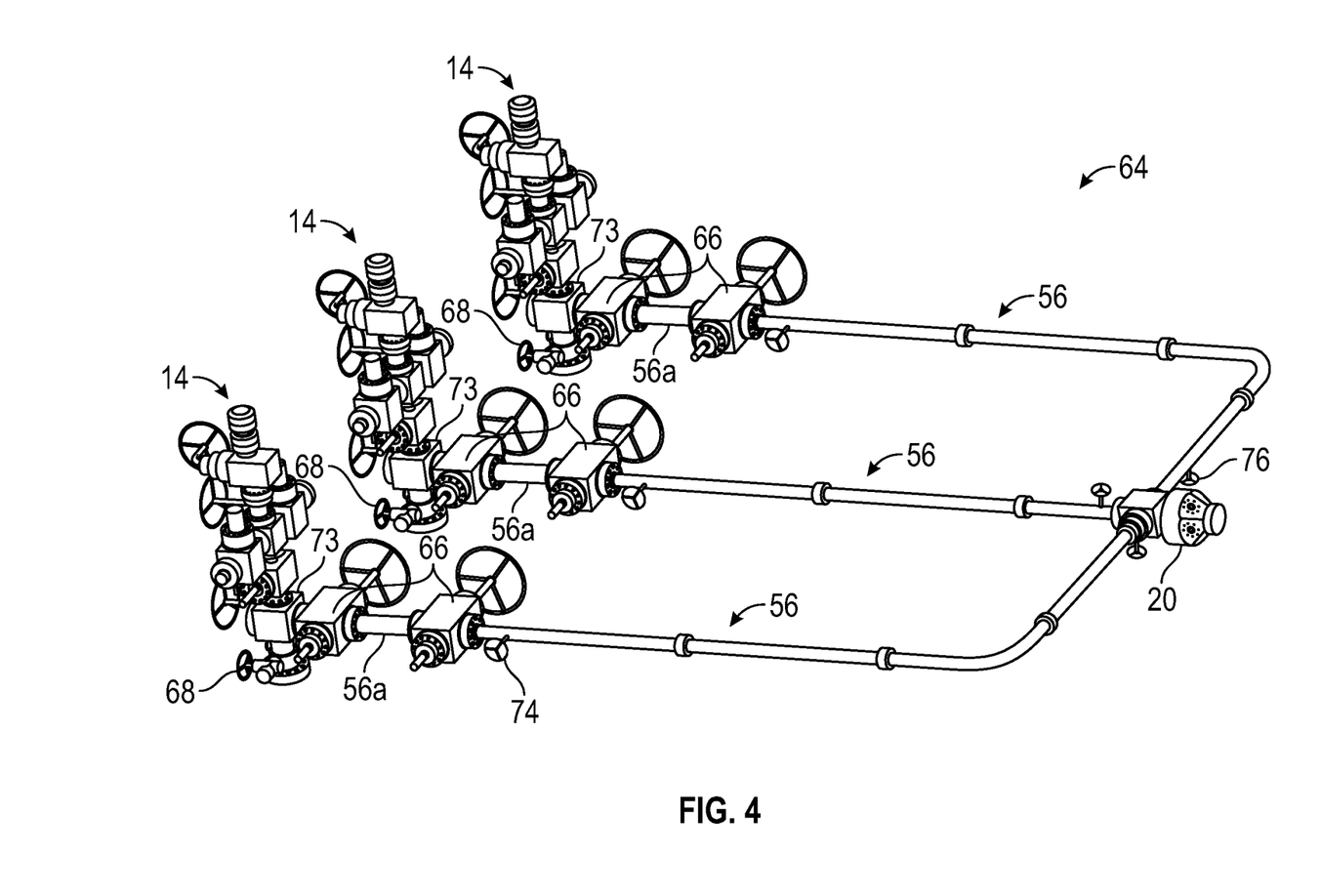
FIG. 4 is a perspective view of a multiple wellhead fluid delivery system, in accordance with an embodiment of the present technology.

The flow system 64 of the present technology includes fluid conduit 56 and valves 66 that are separate and distinct from the tree 14 and tree valves 68, 70, and 72. In fact, in many embodiments, at least a portion of the fluid conduit 56a is positioned between at least one of the valves 66 and the tree 14. One advantage to this arrangement is that fluid flow through the fluid conduit 56 can be controlled and/or stopped, as desired by an operator, independent of the tree 14 before the flow reaches the tree 14. This feature is especially advantageous at a wellsite containing multiple wells, as shown in FIG. 4. Coupling 73 connects the fluid conduit 56a to the tree 14, and can have the ability to rotate to allow rotation of the tree 14 relative to the well and the fluid conduit 56 as needed or desired by an operator. This allows the operator to adjust the radial alignment of the trees so that the planes of the flange faces are coincident or parallel to each other.

FIG. 4 depicts a flow system 64 that includes an inlet head 20, and fluid conduit connecting the inlet head 20 to multiple trees 14, each associated with a well. The particular portion of the fluid conduit 56 between the inlet head 20 and each tree 14 includes at least one valve 66 capable of regulating flow through the fluid conduit 56 between the inlet head 20 and that particular tree 14. Similar to the embodiment shown in FIG. 3 and discussed above, the at least one valve 66, or combination of valves 66, associated with each tree 14 can alternate between an open position, a closed position, and a partially open position. When in the open position, fluid flow through the fluid conduit 56 is unrestricted, and will enter the well, as desired by the operator. When in the closed position, fluid flow through the fluid conduit 56 is prevented by the valve 66. When in the partially open position, fluid flow through the fluid conduit 56 is restricted, but not wholly prevented.

The flow system 64 includes valves 66 that are separate and distinct from the trees 14 and from all valves associated with and/or attached to the trees 14. In fact, in many embodiments, at least a portion of the fluid conduit 56a is positioned between at least one of the valves 66 and the corresponding tree 14 to that valve 66 or series of valves 66. One advantage to this arrangement is that fluid flow through the fluid conduit 56 can be controlled and/or stopped, as desired by an operator, independent of the tree 14 before the flow reaches the tree 14.

One reason the ability to allow or prevent flow before the flow reaches a particular tree 14 is advantageous is because it allows an operator to easily direct flow between wells at a multi-well site as needed in the course of operations. For example, different wells might operate on different cycles in a hydraulic fracturing operation. Thus, it may be desirable to provide pressurized fluid to a particular well at a particular time or place in the frac cycle, while simultaneously stopping the flow of fluid into another well that is in a different place in the frac cycle. With the flow system 64 of the present technology it is possible direct flow between wells continuously simply by opening or closing the valves 66 associated with individual wells. Thus, the flow of pressurized fluid into wells can be managed efficiently. In addition, while flow to a tree 14 is stopped, due to the closing of the corresponding valve 66, valves on the tree can be operated to allow the operator to insert a line, frac isolation ball, etc. as needed.

Another advantage to the flow system 64 of the present technology is a reduction in the amount of piping and other iron needed to manage flow between the hydraulic fracturing pumps 10 and multiple wells. For example, at conventional hydraulic fracturing drilling sites, separate piping may be run all the way from the missile 18 to each individual well. Depending on the size of the operation and the number of wells at the site, this conventional arrangement can lead to a great quantity of piping, and each pipe may contain many bends, turns, and connections to accommodate an indirect path between the pumps 10 and a well.

In stark contrast, the flow system 64 of the present technology provides an inlet head 20 that can be connected to the missile 18 by a single pipe, and that can be located proximate a group of wells. The fluid conduit 56 of the flow system 64 is then required to connect the inlet head 20 and the individual trees 14 over a relatively short distance, and with a relatively low number of bends, turns, and connections. Although the corners of the fluid flow lines are shown in the figures as a single segment with an approximate 90 degree angle, bends in the fluid flow lines can be formed with single segments at angles other than 90 degrees, or can be made up of multiple segments that together form a bend or corner. This arrangement accordingly provides a decrease in set up time, as well as fewer maintenance issues.

Also shown in the flow system 64 of FIG. 4 is a fresh water inlet 74 and a flush port 76. Such fresh water inlet 74 and flush port 76 can be located proximate to the valves 66 and the inlet head 20. With the valves 66 closed and no pressurized fluid being delivered to the fluid conduit 56 from the inlet head 20, fresh water can be injected through the fresh water inlet 74, flow through the fluid conduit 56, and exit at the flush port 76. This process will replace the contents of the fluid conduit 56 with fresh water, flushing any sand and other solids and fluids from the fluid conduit 56. In some alternate embodiments, the positions of the fresh water inlet 74 and the flush port 76 can be switched.

Figure 5:
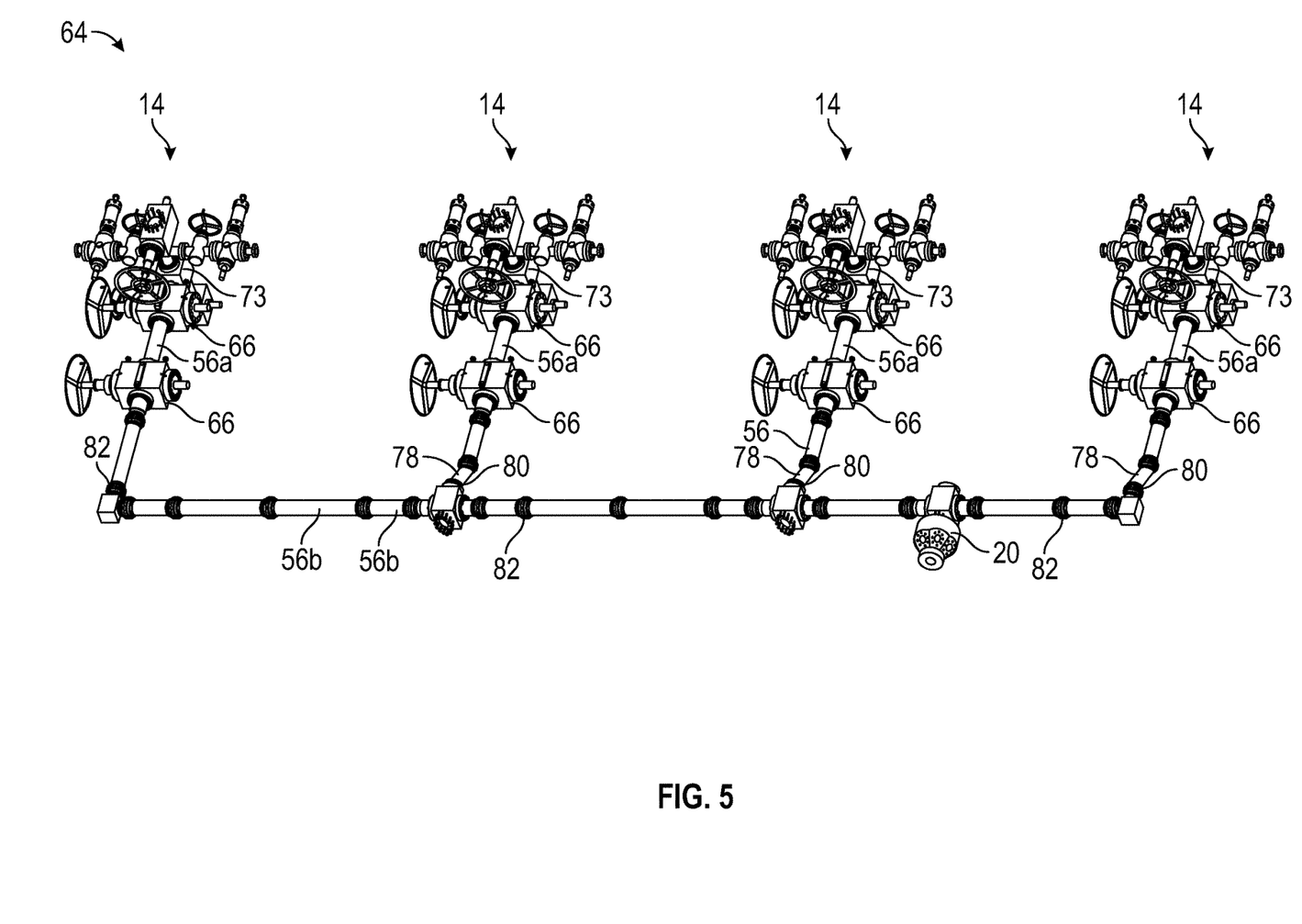
FIG. 5 is a perspective view of an alternate embodiment of a multiple wellhead fluid delivery system, in accordance with an embodiment of the present technology.

Referring now to FIG. 5, there is shown an embodiment of the present technology where the flow system 64 includes multiple trees 14 attached to individual wells. As in embodiments described above, fluid conduit 56 connects the inlet head 20 with each tree 14, and valves 66 are positioned to isolate or connect each tree 14 to pressurized fluid in the fluid conduit 56 as desired by an operator.

FIG. 5 also shows the versatility of the present technology in servicing well sites having any formation. For example, the fluid conduit 56 may be tailored to any configuration necessary to connect the inlet head 20 to the trees 14. The fluid conduit 56 may include expandable or telescoping segments 56b, capable of length adjustment to accommodate variable distances between trees 14 and between the inlet head 20 and trees 14. The expandable joints can have a maximum length and minimum length and can be set at any of an infinite number of lengths between the maximum length and the minimum length. In addition, the fluid conduit 56 may include "S" spools 78 with rotating flanges 80 to accommodate height adjustments. Furthermore, in certain embodiments, the ends of the "S" spools 78 may not be flanged and could include quick connect fittings, for example. This feature may be useful when wells associated with a common flow system 64 are positioned at different elevations. Thus, the combination of telescoping segments 56b and "S" spools 78 with rotating flanges 80 compensates for variances between a site plan and actual spacing between the wells. In addition, these features add adjustability, modularity, and scalability to the system. Support structure, such as struts and braces, can be spaced at various locations along each of the fluid flow lines and used to support the fluid flow lines. Additional structure can be added to provide fall protection around the location of each of the wells.

Additional advantageous features of the flow system 64 include couplings and positioning of the inlet head 20 relative to the trees 14. For example, the couplings 82 between fluid conduit 56 segments can consist of any appropriate type of connector, and are not required to be flange connectors. In some embodiments, the couplings 82 may be quick connect-type clamp connectors, thereby allowing for quick assembly and disassembly of the flow system 64. In addition, in the embodiments shown in FIGS. 5 and 6, the inlet head 20 is not linearly aligned with individual trees 14. Specifically, the inlet head 20 is attached to individual fluid conduit sections that run perpendicular to the longitudinal axis of the inlet head 20, so that the fluid within the fluid conduit 56 changes direction upon flow into the fluid conduit 56 from the inlet head 20. This feature is useful to reduce or prevent packing in the conduits adjacent the valves 66 and trees 14.

The embodiments of FIGS. 3-5 depict flow systems 64 having multiple valves 66 for each tree 14, wherein the valves 66 are positioned in series on a common horizontal plane. Moreover, in each of these embodiments, the fluid conduit 56 is shown to intersect the tree 14 at a relatively low position, adjacent the lower master valve 68. This configuration is beneficial because it slows easier access to the valves 66 for adjustment and management of the overall flow system 64. For example, with the valves 66 located adjacent the lower master valve 68 of each tree 14, an operator standing on the ground can typically access the valves 66 to make adjustments and to open and close valves. This allows operation of the flow system 66 without the need for scaffoldings or other platforms, thereby eliminating a safety risk to the operators. Additional embodiments of the present technology, however, contemplate alternative fluid conduit and valve arrangements.

Figure 6:
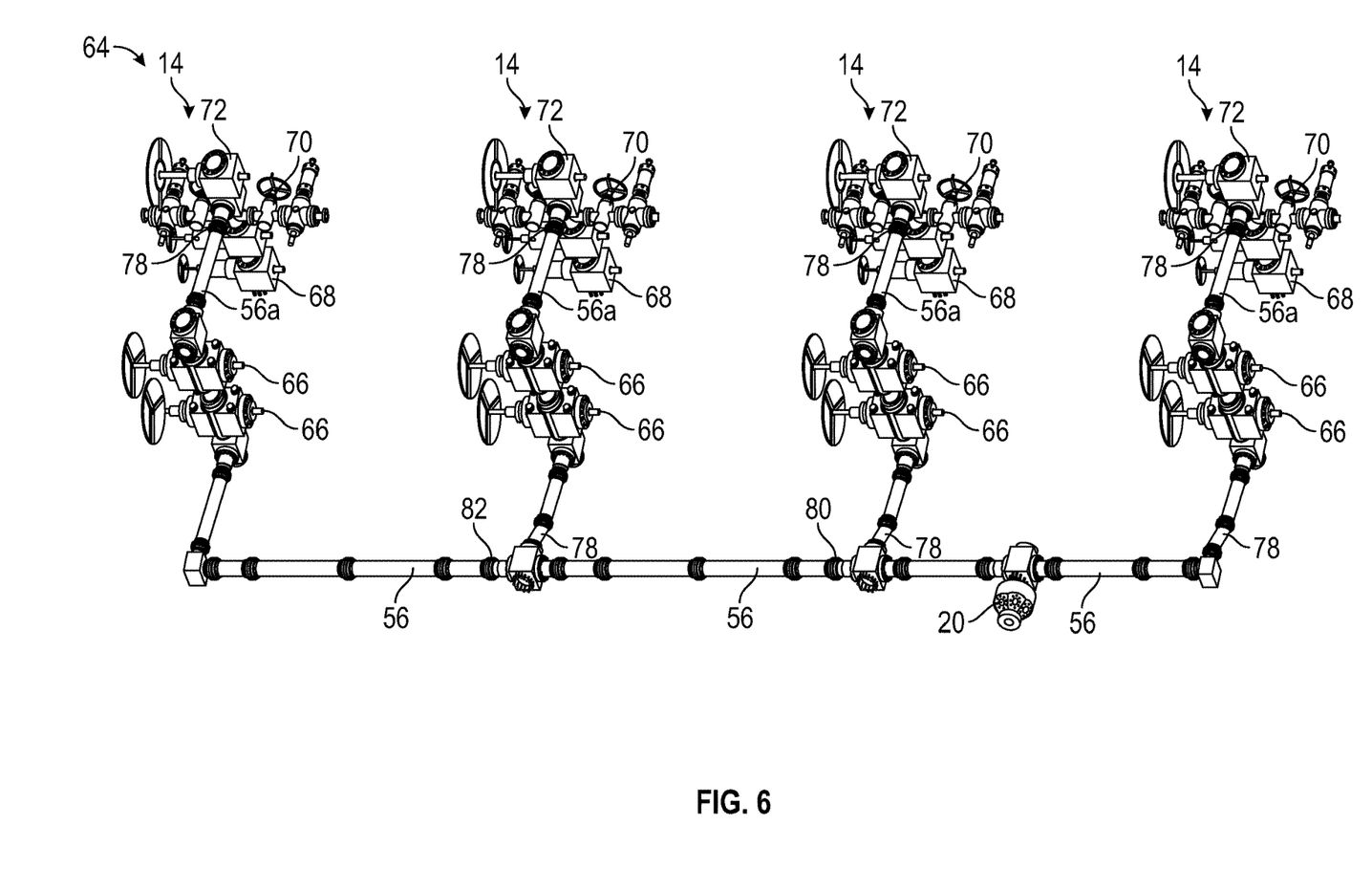
FIG. 6 is a perspective view of another alternate embodiment of a multiple wellhead fluid delivery system, in accordance with an embodiment of the present technology.

For example, the flow system 64 of FIG. 6 includes valves 66 associated with each tree 14 that are not located on the same horizontal plane, but that are stacked one above another. As a result, the portion of the fluid conduit 56a positioned between the valves 66 and each tree 14 connects to the tree 14 at a position above the wing valves 70, adjacent the swab valve 72. Such a configuration may be desirable depending on the specific layout and/or geography of a well site. As discussed above with respect to alternate embodiments, the embodiment of FIG. 6 can include fluid conduit 56 having "S" spools 78 with rotating flanges 80 to accommodate height adjustments. This feature may be useful when wells associated with a common flow system 64 are positioned at different elevations. "S" spools 78 can also be used, for example, between the valves 66 and their respective trees 14, to account for height differences between the a tree 14 and the uppermost valve 66, as will be described below.

Figure 7:
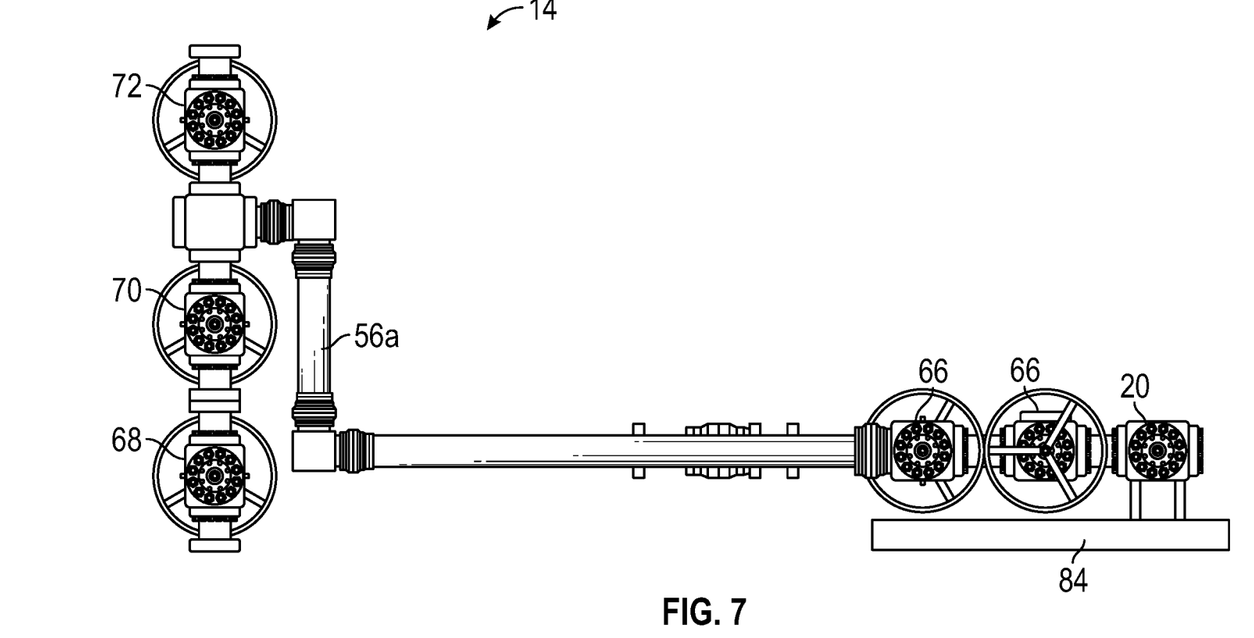
FIG. 7 is a side view of a wellhead fluid delivery system, in accordance with an alternate embodiment of the present technology.
Figure 8:
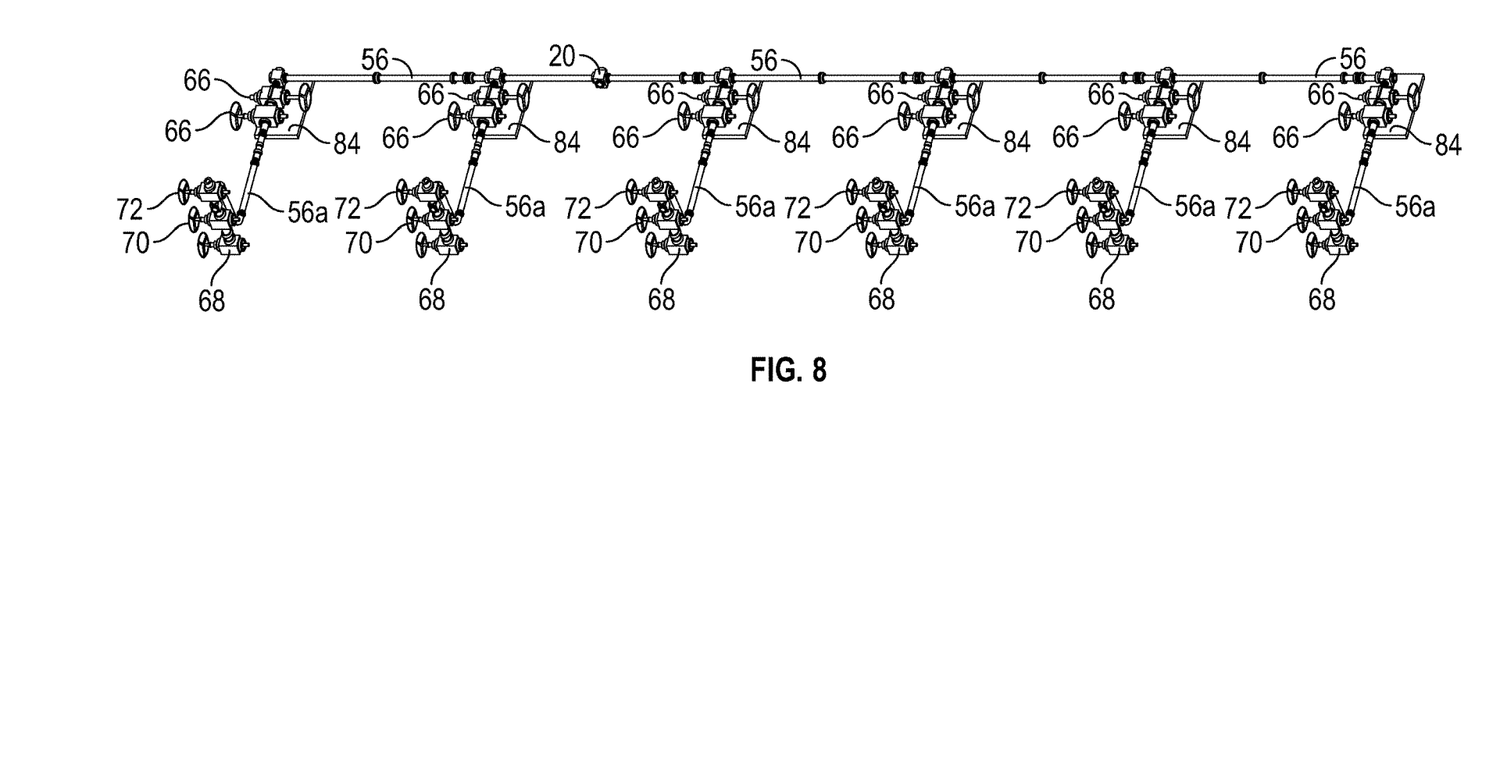
FIG. 8 is a perspective view of a wellhead fluid delivery system, in accordance with an embodiment of the present technology.

FIGS. 7 and 8 show yet another embodiment of the flow system 64 of the present technology. In this embodiment, the valves 66 are positioned in series 66 on the same horizontal plane, but the portion of the fluid conduit 56a between the valves 66 and the tree 14 is dogged upward so that it intersects the tree above the wing valves 70 adjacent the swab valve 72. This embodiment may be advantageous where there is a need for the inlet of the fluid conduit 56 into the tree 14 to be positioned high, adjacent the swab valve 72, but the valves 66 are desired to be located low, so they can be accessed by an operator without use of a scaffolding or platform. Also shown in FIGS. 7 and 8 is an optional skid 84 to support the flow system 64. Such a skid 84 may be used in the flow systems 64 of any embodiment described herein, and may be useful to solidify the footing of the flow system 64 at a well site.

Figure 9:
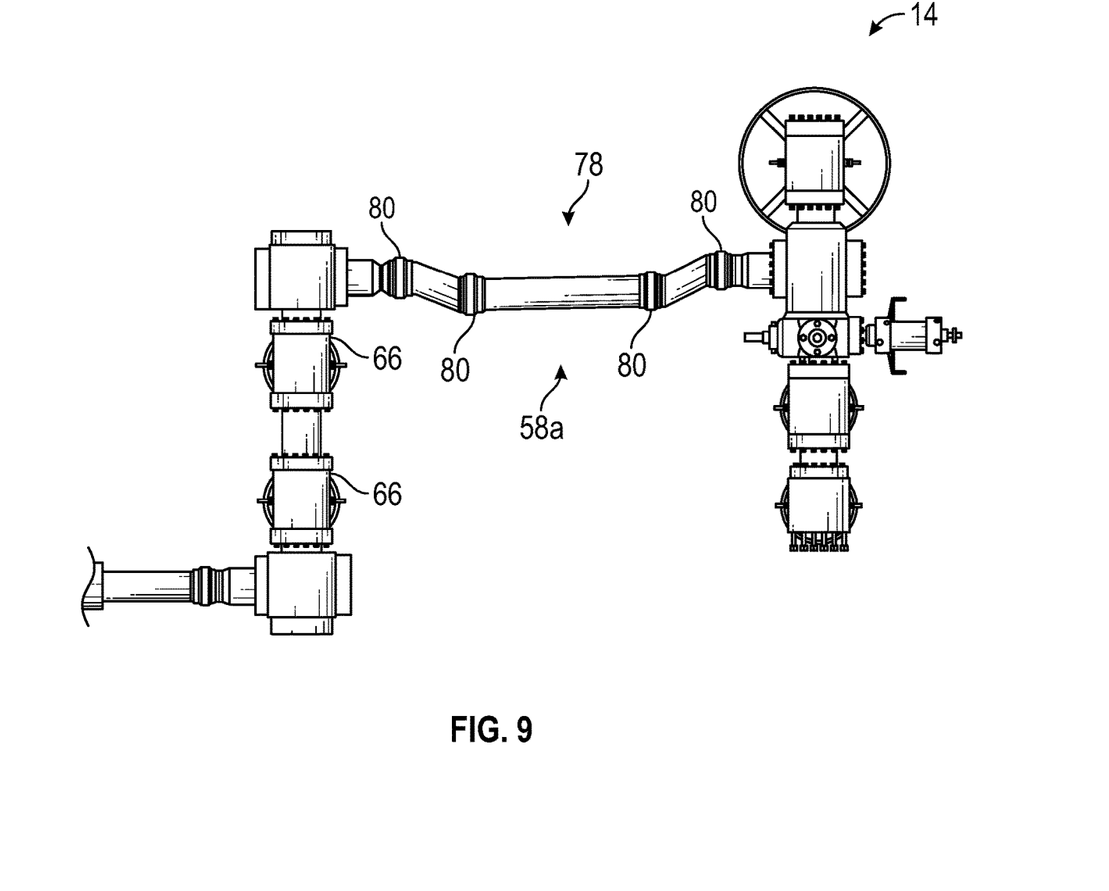
FIG. 9 is a side view of a wellhead fluid delivery system, in accordance with an embodiment of the present technology.

FIG. 9 illustrates another embodiment of the fluid conduit 56a arranged between a vertical fracturing manifold including a pair of valves 66. However, it should be appreciated that the vertical fracturing manifold may include a single valve 66 or multiple valves, and may also include additional auxiliary components, such as tie ins for instrumentation, bleeder valves, and the like. The fluid conduit 58a includes the "S" spool 78 having the rotating flanges 80. In embodiments where the inlet to the tree 14 is at a vertical position higher than the outlet to the vertical fracturing manifold, the rotating flanges 80 of the "S" spool 78 may be used to adjust the connection between the vertical fracturing manifold and the tree 14. For example, if the inlet to the tree 14 is at a lower position, the flanges 80 may be rotated to reduce the vertical elevation of the "S" spool 78, relative to a ground plane, to enable coupling of the fluid conduit 56a between the vertical fracturing manifold and the tree 14. As described above, in certain embodiments the fluid conduit 56a may include expandable joint segments 56b describe above. Accordingly, the connection between the vertical fracturing manifold and the tree 14 may be adjusted in each of the x, y, and z directions in order to facilitate coupling of the fluid conduit 56a.

Figure 10:
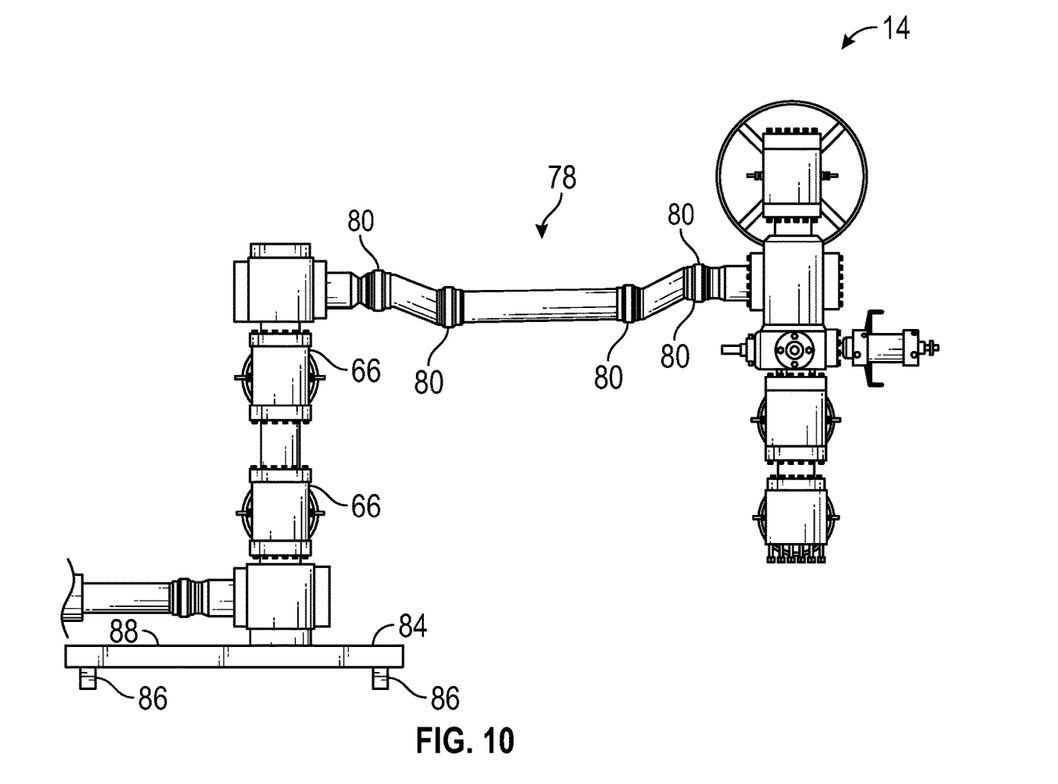
FIG. 10 is a side view of a wellhead fluid delivery system, in accordance with an embodiment of the present technology.

FIG. 10 illustrates another embodiment of the fluid conduit 56a connecting the vertical fracturing manifold to the tree 14, when the vertical fracturing manifold is arranged on the skid 84. In the embodiment illustrated in FIG. 10, the skid 84 is an adjustable skid. The skid 84 includes legs 86 that are positioned on the ground plane to enable vertical adjustment of a top portion 88 of the skid 84. In other words, the legs 86 may be telescopic and expand and contract relative to the top portion 88. In certain embodiments, the skid 86 includes an elevation adjustment device, such as a motor in the form of a linear actuator. Additionally, the legs 86 may include pins and apertures to enable individual adjustment of the top portion 88. That is, the legs 86 may be arranged within a sleeve that includes a series of apertures at different relative elevations. In certain embodiments, the legs 86 include one or more corresponding apertures to align with the apertures on the sleeve such that a pin can be inserted through the apertures to lock the legs 86 in place. Also, in certain embodiments, the legs 86 may include the pin as a spring-loaded device that drives outwardly through the apertures when aligned with the apertures of the sleeve. As such, the vertical position of the outlet of the fracturing manifold may be adjusted to facilitate connection to the tree 14.

Figure 11:
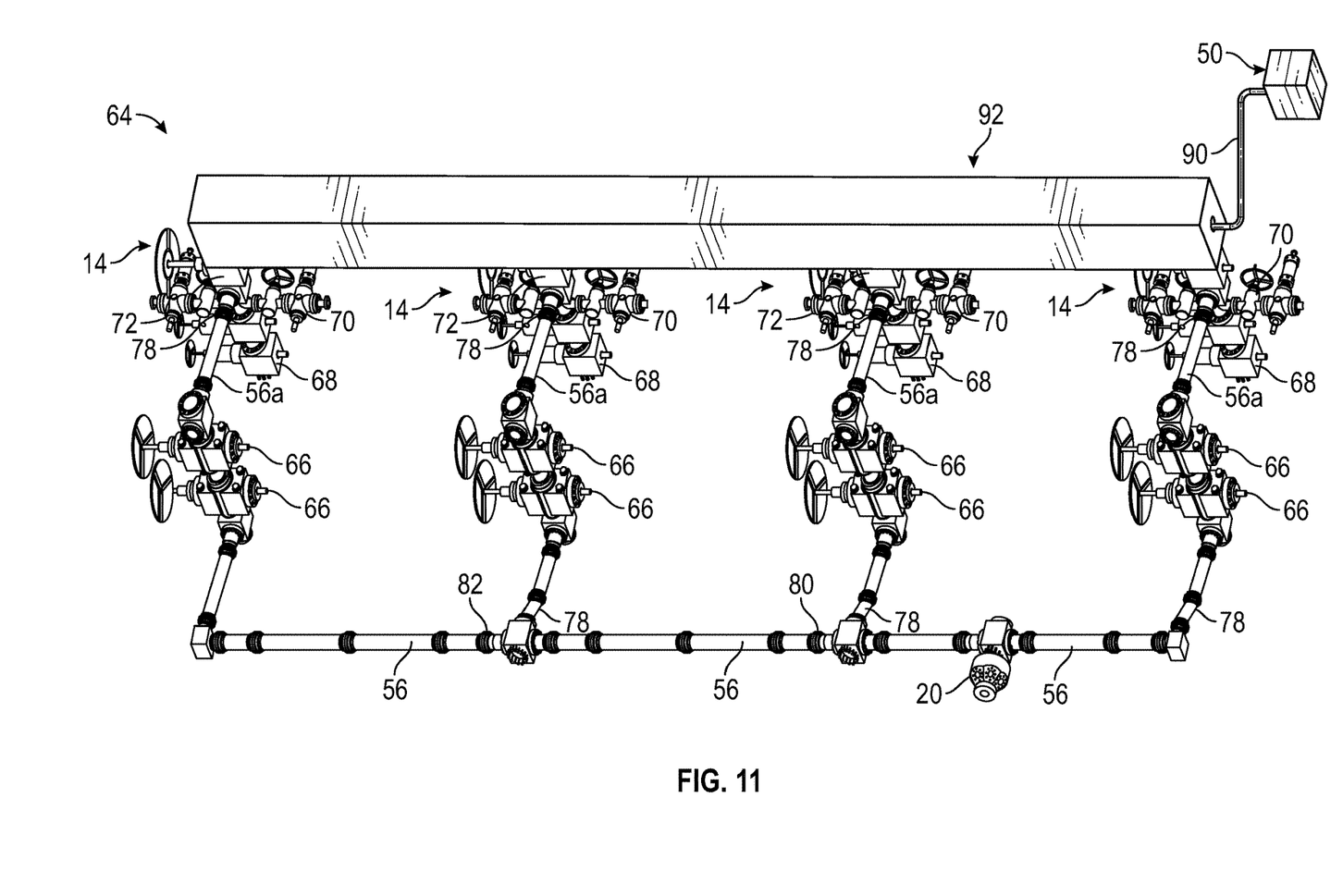
FIG. 11 is a perspective view of another alternate embodiment of a multiple wellhead fluid delivery system, in accordance with an embodiment of the present technology.

FIG. 11 illustrates an embodiment of the flow system 64 including the wireline unit 50. Certain features have been omitted for clarity, but in operation the wireline unit 50 may include a packoff/line wiper, grease head, head catcher, lubricator, and the like to direct the wireline into the wellhead 16. In operation, hydraulic fracturing may be performed in several stages. A wire 90 may be introduced into the wellhead 16. The wire 90 may be a braided wire that includes an electrical cable to enable transmission of information into and out of the wellbore. The wire 90 may be introduced into the wellhead 16 along with a plug. The wire 90 directs the plug to a specified location in the wellbore and then activates the plug to form a seal between other portions of the wellbore. Fracturing fluid may be introduced into the well and a ball or other mechanism may be dropped to block flow of the fracturing fluid past the plug. Thereafter, the high pressure fracturing fluid may fracture the well to provide improved flow characteristics and enable recovery of hard to reach or unconventional hydrocarbons. The wire 90 is removed from the wellbore after the plug or multiple plugs are in position. In certain embodiments, personnel are not positioned near the wellhead 16 when the fracturing operation is underway due to potential safety concerns. As such, operations at the well site may be slowed when several trees 14 are arranged adjacent one another, as operations are halted on adjacent trees 14 when one well is undergoing fracturing operations.

In the illustrated embodiment, the plurality of trees 14 include a wireline controller 92. The wireline controller 92 enables remote operation of the wireline unit 50. In the illustrated embodiment, the wireline controller 92 is positioned on each of the trees 14. Accordingly, the wire 90 may be moved between adjacent trees 14 via the wireline controller 90. It should be appreciated that in certain embodiments each tree 14 of the plurality of trees may have a separate wireline controller 92. Advantageously, fracturing operations at one well can be performed while plugging operations are done in an adjacent well, via the wireline controller 92. Moreover, because the wireline controller 90 may be controlled remotely, personnel will not be on site while the fracturing operations are being performed.

In embodiments, the wireline controller 90 may include a quick connect to couple at least a portion of the wireline unit to the wellhead. Moreover, in embodiments, the wireline controller 90 may also include a quick connect adapter. The quick connect and/or quick connect adapter may be coupled to the plurality of trees 14. Additionally, the quick connect may enable remote connection and disconnection of at least a portion of the wireline unit 50 from the quick connect adapter to enable movement of the wireline unit 50 to an adjacent tree 14 of the plurality of trees 14. In embodiments, the quick connect adapter includes a means to pressure test a portion of the wireline unit, such as a portable pressure testing unit, and to drain hydraulic fluids from at least a portion of the wireline unit.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

That claimed is:

1. A flow system for use at a hydraulic fracturing well site, comprising:
    a tree attached to a wellhead;
    an inlet head in fluid communication with at least one hydraulic fracturing pump at the well site;
    fluid conduit providing fluid communication between the inlet head and the tree; and
    a valve in the fluid conduit and having an open position and a closed position, the valve permitting fluid flow through the fluid conduit when in the open position, and preventing fluid flow through the fluid conduit when in the closed position, at least a portion of the fluid conduit positioned between the valve and the tree having one or more connectors to adjust an elevation of the portion of fluid conduit relative to the tree in response to a rotation of the one or more connectors.

2. The flow system of claim 1, wherein the fluid conduit comprises expandable conduit segments joined by connectors, the expandable conduit sections increasing or decreasing a length of the fluid conduit along an axis.

3. The flow system of claim 1, wherein the flow system further comprises rotatable couplings between the fluid conduit and the tree to allow for radial adjustment of the tree about an axis of the tree.

4. The flow system of claim 1, wherein the valve is a pair of valves, and a portion of the fluid conduit is positioned between the tree and at least one of the valves.

5. The flow system of claim 4, wherein the pair of valves are positioned in series in a common vertical plane.

6. The flow system of claim 5, wherein the pair of valves are arranged to form a vertical fracturing manifold and an outlet of the vertical fracturing manifold is at a lower elevation than an inlet of the tree.

7. The flow system of claim 1, wherein the pair of valves are arranged to form a vertical fracturing manifold and an outlet of the vertical fracturing manifold is at a higher elevation than an inlet of the tree.

8. The flow system of claim 1, wherein the tree is a plurality of trees attached to a plurality of wellheads, and wherein the fluid conduit provides fluid communication between the inlet head and each of the plurality of trees.

9. A flow system for use at a hydraulic fracturing well site, comprising:
    a plurality of trees, each tree attached to a wellhead;
    an inlet head in fluid communication with at least one hydraulic fracturing pump at the well site;
    a fluid conduit providing fluid communication between the inlet head and the plurality of trees, and including rotatable couplings between the fluid conduit and the plurality of trees to allow for vertical adjustment between connectors on a tree of the plurality of trees and connectors on the fluid conduit in response to a rotation of the rotatable couplings; and
    a plurality of valves in the fluid conduit, each valve corresponding to one of the plurality of trees, each valve having an open position and a closed position, each valve permitting fluid flow through the fluid conduit when in the open position, and preventing fluid flow through the fluid conduit when in the closed position, at least a portion of the fluid conduit positioned between at least one of the plurality of valves and a corresponding tree.

10. The flow system of claim 9, further comprising:
    a wireline unit positioned at the well site, a portion of the wireline unit connected to the wellhead using a quick connect; and
    a quick connect adapter coupled to the plurality of trees, the quick connect remotely connecting or disconnecting a portion of the wireline unit from the quick connect adapter attached to the plurality of trees enabling movement of the wireline unit to an adjacent tree of the plurality of trees; and
    the quick connect adapter having means to pressure test a portion of the wireline unit and drain hydraulic fluids from a portion of the wireline unit.

11. The flow system of claim 9, wherein the inlet head has a longitudinal axis, and the fluid conduit has a longitudinal axis, and the longitudinal axis of the fluid conduit adjacent the inlet head is not parallel to the longitudinal axis of the inlet head.

12. The flow system of claim 9, wherein each valve is a pair of valves, and a portion of the fluid conduit is positioned between at least one of the pair of valves and the corresponding tree.

13. The flow system of claim 12, wherein the pair of valves are positioned in series in a common vertical plane.

14. The flow system of claim 9, wherein each tree includes a master service valve, at least one wing valve, and a swab valve, and wherein the fluid conduit attaches to each tree adjacent the master service valve.

15. The flow system of claim 9, wherein each tree includes a master service valve, at least one wing valve, and a swab valve, and wherein the fluid conduit attaches to each tree adjacent the swab valve.

16. A flow system for use at a hydraulic fracturing well site, comprising:
   a tree attached to a wellhead;
   an inlet head in fluid communication with at least one hydraulic fracturing pump at the well site;
   a fluid conduit providing fluid communication between the inlet head and the tree, at least a portion of the fluid conduit coupled to the tree and including one or more components to adjust an elevation of the fluid conduit in response to a rotation of the one or more components;
   a valve in the fluid conduit having an open position and a closed position, the valve permitting fluid flow through the fluid conduit when in the open position, and preventing fluid flow through the fluid conduit when in the closed position; and
   a skid positioned to support the valve, the skid having one or more legs to adjust an elevation of a top portion of the skid relative to a ground plane.

17. The flow system of claim 16, wherein the skid comprises an elevation adjustment device, the elevation adjustment device including a motor, a pin and aperture arrangement, or a combination thereof.

18. The flow system of claim 16, wherein the valve comprises at least two valves, the at least two valves positioned in series in a common vertical plane.

19. The flow system of claim 16, wherein an outlet of the valve is positioned at a lower elevation than an inlet to the tree and the portion of the fluid conduit extends between the outlet of the valve and the inlet to the tree.

20. The flow system of claim 16, wherein the fluid conduit comprises couplings at end portions, the couplings being rotatable about a longitudinal axis of the fluid conduit to allow for adjustment of a position of the fluid conduit in at least two directions.

* * * * *